(12) United States Patent
Yoon et al.

(10) Patent No.: US 12,724,113 B2
(45) Date of Patent: Sep. 1, 2026

(54) DEVICE AND METHOD FOR REMOVING CLUTTER IN RADAR SYSTEM

(71) Applicant: AGENCY FOR DEFENSE DEVELOPMENT, Daejeon (KR)

(72) Inventors: Ji Hwan Yoon, Daejeon (KR); Yong Min Kim, Daejeon (KR); Won Jin Lee, Daejeon (KR); Jieun Roh, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 410 days.

(21) Appl. No.: 18/218,564

(22) Filed: Jul. 5, 2023

(65) Prior Publication Data

US 2024/0019538 A1 Jan. 18, 2024

(30) Foreign Application Priority Data

May 9, 2022 (KR) ........................ 10-2022-0056870

(51) Int. Cl.
*G01S 7/292* (2006.01)
*G01S 7/41* (2006.01)
*G01S 13/58* (2006.01)

(52) U.S. Cl.
CPC ............ *G01S 7/2921* (2013.01); *G01S 7/414* (2013.01); *G01S 13/582* (2013.01)

(58) Field of Classification Search
CPC ...... G01S 7/292; G01S 7/2921; G01S 7/2923; G01S 7/2927; G01S 7/41; G01S 7/414;
(Continued)

(56) References Cited

U.S. PATENT DOCUMENTS 4,459,592 A * 7/1984 Long ...................... G01S 13/524 342/160
5,539,412 A * 7/1996 Mendelson ............ G01R 23/16 324/76.19
(Continued)

FOREIGN PATENT DOCUMENTS

JP 2001194451 7/2001
JP 4141604 8/2008
(Continued)

OTHER PUBLICATIONS

Kim, H. (2019). Removal of Clutter from Doppler Radar Signal to Measure Accurate Muzzle Velocity. Journal of Advanced Navigation Technology, 23(2), 142-150. https://doi.org/10.12673/JANT.2019.23.2.142 (Year: 2019).*
(Continued)

*Primary Examiner* — Resha Desai
*Assistant Examiner* — Remash R Guyah
(74) *Attorney, Agent, or Firm* — JCIPRNET

(57) ABSTRACT

The present disclosure relates to a radar system including a pulse Doppler radar. A method of removing clutter according to the present disclosure includes obtaining chirp rate information on a chirp rate applied to a transmission signal of the pulse Doppler radar, determining a reference Doppler frequency for removing a clutter signal by considering the chirp rate information, and removing a signal having a frequency less than or equal to the reference Doppler frequency.

7 Claims, 7 Drawing Sheets

(58) Field of Classification Search
CPC .......... G01S 13/18; G01S 13/22; G01S 13/24; G01S 13/26; G01S 13/28; G01S 13/32; G01S 13/34; G01S 13/50; G01S 13/52; G01S 13/524; G01S 13/526; G01S 13/528; G01S 13/53; G01S 13/534; G01S 13/536; G01S 13/538; G01S 13/58; G01S 13/582; G01S 13/584; G01S 13/586
USPC .... 342/82–91, 118, 127, 159–162, 165–167, 342/192–197, 200–201, 378, 450–465
See application file for complete search history.

(56) References Cited

U.S. PATENT DOCUMENTS

| | | | | |
|---|---|---|---|---|
| 2015/0226848 | A1* | 8/2015 | Park | G01S 13/584<br>342/93 |
| 2021/0318424 | A1* | 10/2021 | Wang | G01S 13/582 |
| 2022/0404466 | A1* | 12/2022 | Jones | G01S 7/414 |
| 2023/0059452 | A1* | 2/2023 | Schuman | G01S 13/582 |

FOREIGN PATENT DOCUMENTS

| | | | |
|---|---|---|---|
| JP | 2010281689 | 12/2010 | |
| JP | 2011043418 | 3/2011 | |
| JP | 5235737 | 7/2013 | |
| KR | 101993855 | 6/2019 | |
| KR | 102204839 | 1/2021 | |
| WO | WO1996000909 A1 * | 1/1996 | G01S 13/30 |

OTHER PUBLICATIONS

T. Ince. “FMCW Radar Performance for Atmospheric Measurements.” Radioengineering 19.1 (2010): 129-135. (Year: 2010).*

“Office Action of Korea Counterpart Application”, issued on Jun. 17, 2022, with English translation thereof, p. 1-p. 11.

“Notice of Allowance of Korea Counterpart Application”, issued on Sep. 8, 2022, with English translation thereof, p. 1-p. 11.

Hyoung-Rae Kim, “Removal of Clutter from Doppler Radar Signal to Measure Accurate Muzzle Velocity,” Journal of Advanced Navigation Technology, vol. 23, Apr. 2019, pp. 142-150.

* cited by examiner

DEVICE AND METHOD FOR REMOVING CLUTTER IN RADAR SYSTEM

CROSS-REFERENCE TO RELATED APPLICATION

This application is based on and claims priority under 35 U.S.C. § 119 to Korean Patent Application No. 10-2022-0056870, filed on May 9, 2022, in the Korean Intellectual Property Office, the disclosure of which is incorporated by reference herein in its entirety.

BACKGROUND

1. Field

The present disclosure generally relates to a radar system using a pulse Doppler radar mounted on a moving object, and more specifically, to a device and a method for improving target detection performance of a pulse Doppler radar by adaptively changing a reference Doppler frequency for removing clutter.

2. Description of the Related Art

A radar refers to a device that transmits a radio frequency (RF) signal to a target and receives reflective waves reflected from the target to obtain information on a range, velocity, and angle of the target. Accordingly, the radar is widely used as a military apparatus for tracking targets, such as missiles or aircrafts of an enemy. In general, a radar detects and tracks a target by using a RF signal in a microwave band to obtain information on the target.

The radar detects a target range by measuring the time taken for the transmitted radio waves to be reflected from the target and return thereto. Here, the frequency changes due to a Doppler effect when the radar is mounted in a moving object, such as an aircraft, and accordingly, it is difficult to accurately detect the target range between the radar and the target. That is, in order to detect a target range by considering the Doppler effect, a pulse Doppler radar is used as a radar mounted in a moving object.

The pulse Doppler radar uses a pulse repetition frequency (PRF) to detect or track a target. The selection of PRF is important for radar design, and the PRF may be divided into low pulse repetition frequency (LPRF), medium pulse repetition frequency (MPRF), and high pulse repetition frequency (HPRF). A pulse Doppler radar may select a PRF and detect a target through a transmission pulse signal according to the selected waveform.

The related art has a problem in that range ambiguity or Doppler ambiguity exists according to the selected PRF and the pulse Doppler radar does not accurately measure a target range or velocity due to the ambiguity. Accordingly, technology for accurately detecting a target by resolving the ambiguity from a signal received by a pulse Doppler radar is being developed.

The technology is technical information that an inventor possesses for derivation of the present disclosure or obtained during the derivation of the present disclosure, and does not necessarily indicate known technology disclosed to the general public prior to filing the present disclosure.

SUMMARY

The present disclosure provides a device and method for removing clutter included in a received signal of a radar in a radar system using a pulse Doppler radar.

Also, the present disclosure provides a device and a method for accurately determining Doppler frequencies for removing clutter by considering a chirp rate and a beam steering angle applied to frequency modulation (FM) ranging in a radar system.

Also, the present disclosure provides a device and a method for accurately determining Doppler frequencies and accurately setting a target detection region in a radar system.

Also, the present disclosure provides a device and method for increasing a target detection range and improving target detection performance by accurately determining Doppler frequencies in a radar system.

Additional aspects will be set forth in part in the description which follows and, in part, will be apparent from the description, or may be learned by practice of the presented embodiments of the disclosure.

According to various embodiments, an operating method of a clutter removal device in a radar system including a pulse Doppler radar includes obtaining chirp rate information on a chirp rate applied to a transmission signal of the pulse Doppler radar, determining a reference Doppler frequency for removing a clutter signal by considering the chirp rate information, and removing a signal having a frequency less than or equal to the reference Doppler frequency.

According to another embodiment, the operating method of the clutter removal device further include obtaining calculation information, and the calculation information may include a movement speed of the pulse Doppler radar, an altitude of the pulse Doppler radar, a wavelength of an operating frequency of the pulse Doppler radar, a first beam steering angle of the pulse Doppler radar, and a beam width of an antenna of the pulse Doppler radar.

According to another embodiment, the determining of the reference Doppler frequency may include determining a plurality of Doppler frequencies based on the calculation information and the chirp rate information, and determining the reference Doppler frequency based on the plurality of Doppler frequencies.

According to another embodiment, the determining the plurality of Doppler frequencies may include determining a second beam steering angle based on the calculation information, determining a first Doppler frequency for the second beam steering angle, determining a second Doppler frequency for an angle obtained by adding an angle corresponding to the beam width to the first beam steering angle, determining a third Doppler frequency for an angle obtained by removing the angle corresponding to the beam width from the first beam steering angle, and determining a fourth Doppler frequency for the first beam steering angle.

According to another embodiment, the determining of the second beam steering angle may include determining a first calculation value based on the movement speed, the altitude, the chirp rate information, and the wavelength of the operating frequency, determining a second calculation value from the first calculation value based on a function that derives a real value, and determining the second beam steering angle based on the second calculation value.

According to another embodiment, the first calculation value may indicate a first calculation value, a chirp rate, a wavelength of an operating frequency, an altitude of a pulse Doppler radar, the speed of light, and a movement speed of the pulse Doppler radar, and the second calculation value may be determined based on the second calculation value, and the second beam steering angle may be determined based on the second calculation value.

According to another embodiment, each of a plurality of Doppler frequencies may be determined based on a Doppler frequency, a movement speed, a wavelength of an operating frequency, the speed of light, a chirp rate, an altitude, and a beam steering angle.

According to another embodiment, the determining of the reference Doppler frequency may include determining a difference between the fourth Doppler frequency and a greatest Doppler frequency among the first Doppler frequency, the second Doppler frequency, and the third Doppler frequency, as the reference Doppler frequency.

According to various embodiments, a clutter removal device in a radar system including a pulse Doppler radar includes a processor, wherein the processor may obtain chirp rate information on a chirp rate applied to a transmission signal of the pulse Doppler radar, determine a reference Doppler frequency for removing a clutter signal by considering the chirp rate information, and remove a signal having a frequency less than or equal to the reference Doppler frequency.

According to another embodiment, the processor may obtain calculation information, and the calculation information may include a movement speed of the pulse Doppler radar, an altitude of the pulse Doppler radar, a wavelength of an operating frequency of the pulse Doppler radar, a first beam steering angle of the pulse Doppler radar, and a beam width of an antenna of the pulse Doppler radar.

According to another embodiment, the processor may determine a plurality of Doppler frequencies based on the calculation information and the chirp rate information, and determine the reference Doppler frequency based on the plurality of Doppler frequencies.

According to another embodiment, the processor may determine a second beam steering angle based on the calculation information, determine a first Doppler frequency for the second beam steering angle, determine a second Doppler frequency for an angle obtained by adding an angle corresponding to the beam width to the first beam steering angle, determine a third Doppler frequency for an angle obtained by removing the angle corresponding to the beam width from the first beam steering angle, and determine a fourth Doppler frequency for the first beam steering angle.

According to another embodiment, the processor may determine a first calculation value based on the movement speed, the altitude, the chirp rate information, and the wavelength of the operating frequency, determine a second calculation value from the first calculation value based on a function that derives a real value, and determine the second beam steering angle based on the second calculation value.

According to another embodiment, the processor may determine a difference between the fourth Doppler frequency and a greatest Doppler frequency among the first Doppler frequency, the second Doppler frequency, and the third Doppler frequency, as the reference Doppler frequency.

Various aspects and features of the present disclosure are defined by the appended claims. Combinations of features of the dependent claims may be not only explicitly presented in the claims but also combined with features of the independent claims as appropriate.

Also, one or more features selected from any one embodiment described in the present disclosure may be combined with one or more features selected from any other embodiment described in the present disclosure, and alternative combinations of the features at least partially reduce one or more technical issues discussed in the present disclosure or at least partially reduce technical issues discernable by those skilled in the art from the present disclosure, and furthermore, a particular combination or permutation of the embodiment features formed in this way may be made unless the particular combination or permutation is understood by a person skilled in the art to be incompatible.

In any described example implementation, two or more physically separate components may alternatively be integrated into a single component when the integration may be made, and the integration may be made when the same function is performed by a single component formed in this way. In contrast to this, a single component in any embodiment described in the present may alternatively be implemented as two or more separate components that achieve the same function if appropriate.

Objects of certain embodiments are to solve, reduce, or remove at least in part at least one of problems and/or disadvantages associated with the related art. Certain embodiments aim to provide at least one of the advantages described below.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
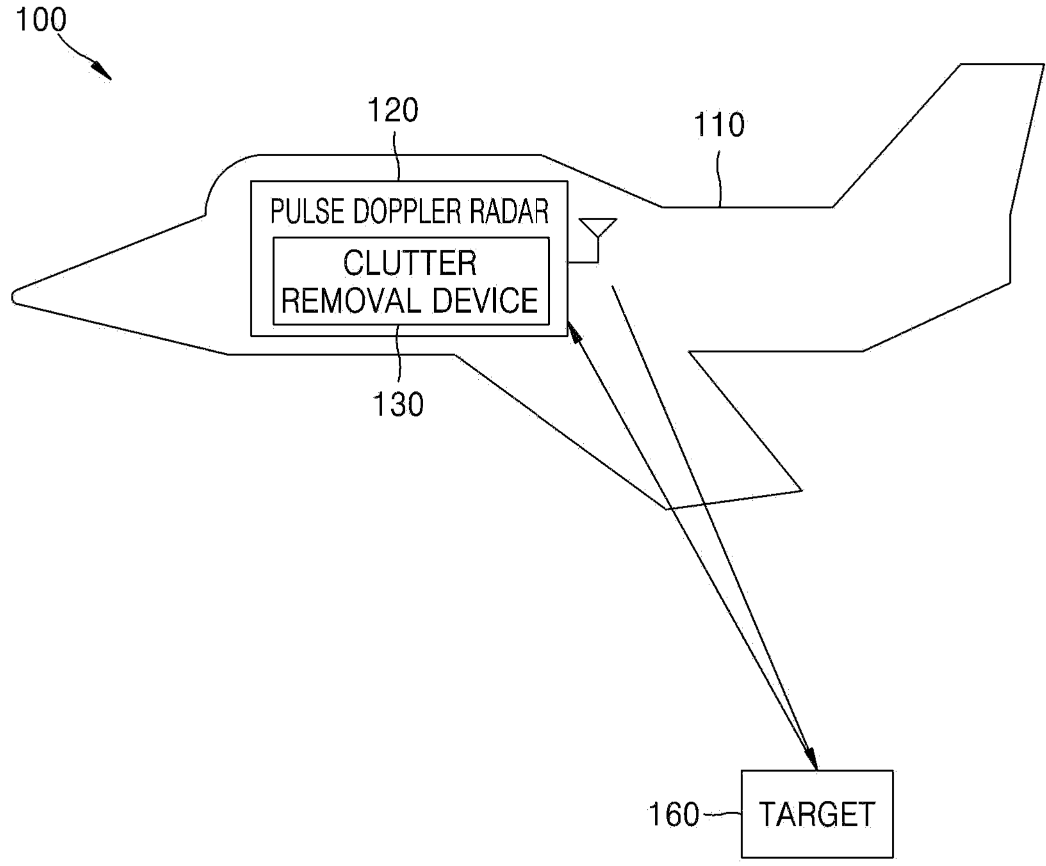
FIG. 1 illustrates a radar system according to various embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Terms used in the present disclosure are used only to describe a certain embodiment and may not be intended to limit the scopes of other embodiments. Singular expressions may include plural expressions unless the context clearly dictates otherwise. Terms, which include technical or scientific terms and are used herein, may have the same meaning as commonly understood by those skilled in the art described in the present disclosure. Among the terms used in the present disclosure, terms defined in general dictionaries may be interpreted as having the same or similar meanings as those in the context of the related art, and unless explicitly defined in the present disclosure, the terms are not to be construed in an idealized or overly formal sense. In some cases, the terms may not be interpreted to exclude embodiments even defined in the present disclosure.

In various embodiments described below, a hardware access method is described as an example. However, various embodiments include technology using both hardware and software, and accordingly, the various embodiments do not exclude software-based access methods.

Hereinafter, the present disclosure relates to a radar system using a pulse Doppler radar mounted on a moving object. Specifically, the present disclosure describes technology for improving target detection performance of a pulse Doppler radar by adaptively changing a reference Doppler frequency for removing clutter.

Hereinafter, various embodiments are described in detail such that those skilled in the art in which the present disclosure belongs may easily implement the present disclosure with reference to the accompanying drawings. However, the technical idea of the present disclosure may be implemented in various forms, and accordingly, the present disclosure is not limited to the embodiments described herein. In describing the embodiments disclosed herein, when it is determined that a detailed description of a related known technology may obscure the gist of the technical idea of the present disclosure, the detailed description of the related known technology is omitted. The same or similar components are denoted by the same reference numerals, and redundant descriptions thereof are omitted.

Herein, when a component is described as being "connected" to another component, this includes not only a case of being "directly connected" thereto but also a case of being "indirectly connected" thereto with another component therebetween. When a component "includes" another component, this means that the component may further include other components without excluding other components in addition to another component unless otherwise stated.

Some embodiments may be described as functional block structures and various processing operations. Some or all of the functional blocks may be implemented by any number of hardware and/or software components that perform a particular function. For example, functional blocks of the present disclosure may be implemented by one or more microprocessors or circuit configurations for a preset function. The functional blocks of the present disclosure may be implemented in a variety of programming or scripting languages. The functional blocks of the present disclosure may be implemented by an algorithm executed by one or more processors. Functions performed by the functional blocks of the present disclosure may be performed by a plurality of functional blocks, or the functions performed by the plurality of functional blocks of the present disclosure may be performed by one functional block. In addition, the present disclosure may employ the known art to perform electronic environment setting, signal processing, and/or data processing.

In addition, the present disclosure uses expressions of more than and less than to determine whether a preset condition is satisfied or fulfilled, but this is only a description to express an example and does not exclude expressions of more than or equal to and less than or equal to. Conditions described as "more than or equal to" may be replaced with "more than", conditions described as "less than or equal to" may be replaced with "less than", and conditions described as "more than or equal to and less than" may be replaced with "more than and less than or equal to".

FIG. 1 illustrates a radar system 100 according to various embodiments.

The radar system 100 indicates a system for target detection by checking a received signal reflected from a target by using a radar. That is, the radar may transmit a transmission signal for target detection to a target 160 and extract information about the target from a signal scattered and reflected from the target 160. FIG. 1 illustrates a case in which the radar system 100 includes a radar and the target 160, and there may be a plurality of radars and a plurality of targets according to circumstances.

The radar may output a transmission signal to the target 160 to detect the target 160. The radar may perform a conversion function between a base band signal and a bit stream. For example, the radar may generate complex symbols by encoding and modulating a transmission bit stream. That is, the radar may synthesize frequencies to modulate a phase, up-convert the base band signal into a radio frequency (RF) signal, and output a radar transmission signal to the outside by using at least one antenna array including antenna components.

Thereafter, the radar may obtain information on the target 160 by receiving the RF signal reflected from the target 160. The radar may receive the RF signal reflected from the target 160 by using at least one antenna array including antenna components, down-convert the received signal into a base band signal, demodulate and decode the base band signal, and recover the received bit stream, thereby detecting the target 160 or checking a target range.

The radar may be mounted in a moving object 110, such as a vehicle or an aircraft to be operated. In this case, the Doppler effect may be applied to the transmission signal and the received signal due to movement of the radar, and accordingly, frequency may change and it is difficult to accurately detect the target 160 due to the frequency change. In contrast to this, a pulse Doppler radar 120 may be used as a radar mounted in the moving object 110. Hereinafter, a radar may indicate the pulse Doppler radar 120.

A clutter removal device 130 indicates a device that analyzes a received signal obtained by the pulse Doppler radar 120. The clutter removal device 130 may remove a signal having a frequency lower than or equal to a preset frequency from the received signal obtained by the pulse Doppler radar 120. When the pulse Doppler radar 120 is mounted in the moving object 110, clutter signals having a preset Doppler region may be introduced according to a movement speed of the moving object 110. Among the clutter signals, a main lobe clutter (MLC) signal introduced from a main lobe of a radar antenna and a side lobe clutter (SLC) signal introduced from a sidelobe thereof reduce the target detection performance of the pulse Doppler radar 120.

The clutter removal device 130 may perform an operation to remove the MLC signal and the SLC signal. The clutter removal device 130 may check a range-Doppler graph from a signal reflected from the target 160 and remove the MLC signal and the SLC signal. Specifically, the clutter removal device 130 may remove the clutter signals by determining a Doppler frequency by considering a speed, an altitude, a beam steering angle, and a beam width of the moving object 110 and removing a signal in a frequency domain less than the Doppler frequency. Here, the Doppler frequency may indicate a frequency value in a Doppler region.

FIG. 1 illustrates a case in which the clutter removal device 130 is included in the pulse Doppler radar 120, but the clutter removal device 130 may be implemented as a separate device operating outside the pulse Doppler radar 120.

Figure 2:
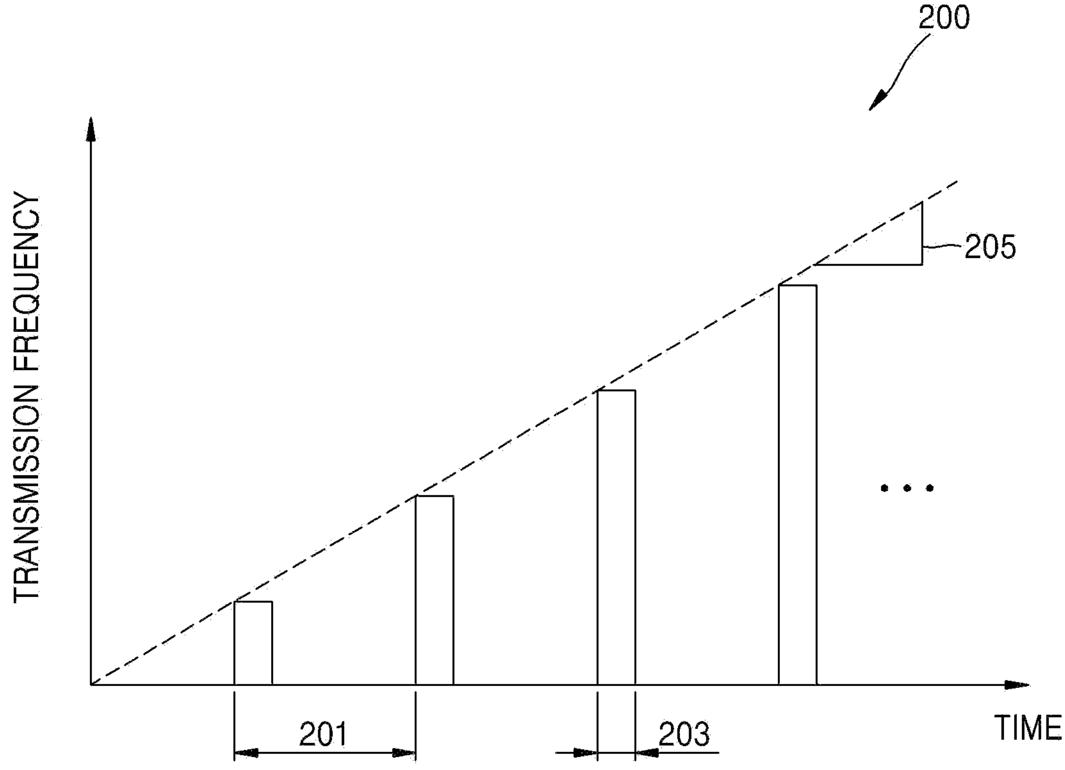
FIG. 2 illustrates an example of a time-frequency graph of a transmission signal transmitted by a pulse Doppler radar in a radar system according to various embodiments.

FIG. 2 illustrates an example of a time-frequency graph 100 of a transmission signal transmitted by the pulse Doppler radar 120 in the radar system 100 according to various embodiments. In FIG. 2, a horizontal axis denotes time and a vertical axis denotes a transmission frequency.

The pulse Doppler radar 120 may use a frequency modulation (FM) ranging technique in which frequencies of pulses of a transmission signal are changed according to a chirp rate to measure a target range. That is, the pulse Doppler radar 120 may modulate the frequencies of pulses of the transmission signal for FM ranging and output the modulated transmission signal to the target 160.

Referring to FIG. 2, the pulse Doppler radar 120 may generate a pulse signal in which pulses having previously set time intervals 203 are arranged in a first cycle 201. Here, the pulse Doppler radar 120 may generate a signal in which frequencies of pulses linearly change according to a chirp rate 205. The pulse Doppler radar 120 may transmit a transmission signal illustrated in FIG. 2 to the target 160 and receive a signal reflected from the target 160.

The pulse Doppler radar 120 may select a pulse repetition frequency (PRF) to detect or track a target at a long range and detect the target from a transmission pulse signal according to the selected waveform. When the pulse Doppler radar 120 uses a low pulse repetition frequency (LPRF), a pulse repetition interval (PRI) is large, and accordingly, there is no ambiguity on range but there is Doppler ambiguity. It is difficult to distinguish clutter and other targets from a received signal when there is Doppler ambiguity, and accordingly, the pulse Doppler radar 120 mainly uses a high pulse repetition frequency (HPRF) having clutter-free features. However, the HPRF also has range ambiguity, and accordingly, the pulse Doppler radar 120 may modulate frequencies of pulses according to a chirp rate through FM ranging.

When the frequencies of the pulses are changed linearly according to FM ranging, the Doppler frequency of the clutter signal introduced to the pulse Doppler radar 120 may be changed. That is, MLC region after FM ranging are applied and MLC region before the FM ranging is applied are different from each other, but the known clutter removal device could not effectively remove the MLC because the MLC region changing according to FM ranging is not considered. The clutter removal device 130 according to the present disclosure may efficiently remove MLC corresponding to FM ranging by adaptively determining a Doppler frequency for clutter removal by considering a chirp rate and a beam steering angle. Hereinafter, an operating method of the clutter removal device 130 is described in detail.

Figure 3:
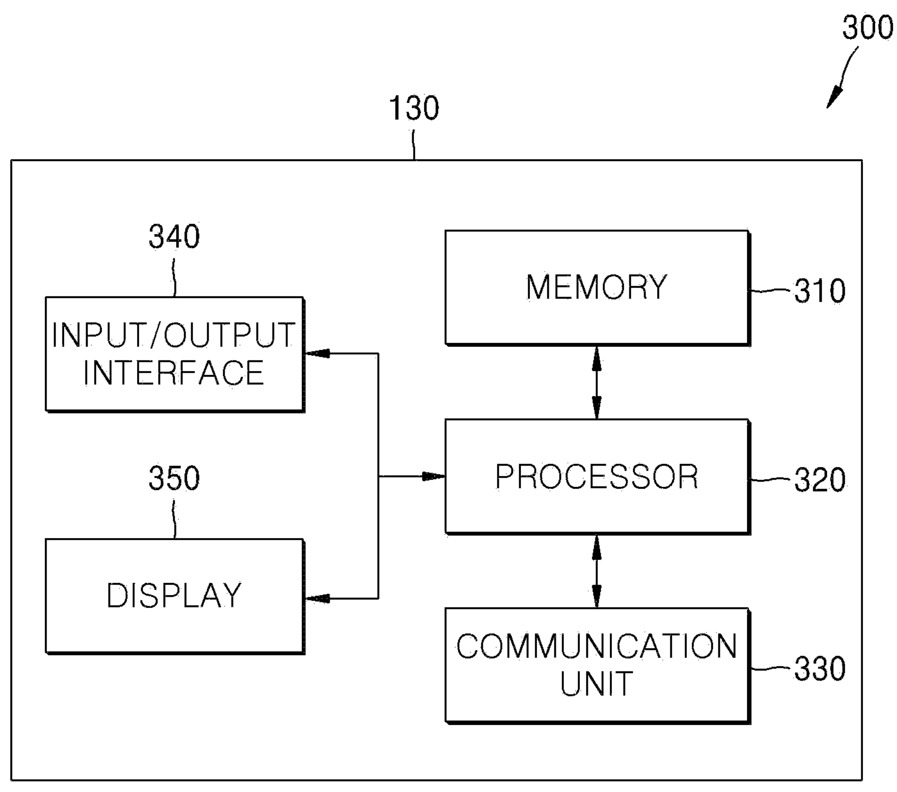
FIG. 3 illustrates a configuration of a clutter removal device in a radar system according to various embodiments.

FIG. 3 illustrates a configuration 300 of the clutter removal device 130 in the radar system 100 according to various embodiments. A term, such as '. . . portion' or '. . . er/or' used herein, refers to a unit that processes at least one function or operation and may be implemented by hardware, software, or a combination of hardware and software. The clutter removal device 130 may include a memory 310, a processor 320, a communication unit 330, an input/output interface 340, and a display 350.

The memory 310 temporarily or permanently stores data, such as a basic program for operation of the clutter removal device 130, an application program, and setting information. The memory 310 may include random access memory (RAM), read only memory (ROM), and a permanent mass storage device, such as a disk drive, but the present disclosure is not limited thereto. The software components may be loaded from a computer-readable recording medium separate from the memory 310 by using a drive mechanism. The separate computer-readable recording medium may include a computer-readable recording medium, such as a floppy drive, a disk, a tape, a digital video disk (DVD)/compact disk (CD)-ROM drive, or a memory card. Depending on embodiments, the software components may also be loaded into the memory 310 through the communication unit 330 rather than a computer-readable recording medium. Also, the memory 310 may provide stored data according to a request of the processor 320. According to one embodiment, the memory 310 may store chirp rate information on a chirp rate applied to transmission pulses of a pulse Doppler radar and calculation information for determining a reference Doppler frequency.

The processor 320 controls all operations of the clutter removal device 130. For example, the processor 320 may control signals to be transmitted and received through the communication unit 330. In addition, the processor 320 may be configured to process instructions of a computer program by performing basic arithmetic, logic, and input/output operations. The instructions may be provided to the processor 320 by the memory 310 or the communication unit 330. For example, the processor 320 may be configured to perform the received instructions according to program code stored in a recording device, such as the memory 310.

According to one embodiment, the processor 320 may obtain chirp rate information on a chirp rate applied to transmission pulses of a pulse doppler radar, determine a reference Doppler frequency for removal of a clutter signal based on the chirp rate information, and remove a signal having a frequency less than or equal to the reference Doppler frequency. For example, the processor 320 may control the clutter removal device 130 to perform operations according to various embodiments to be described below.

The communication unit 330 performs functions for transmitting and receiving signals through a wireless channel. All or part of the communication unit 330 may be referred to as a transmission unit, a reception unit, or a transmission/reception unit. The communication unit 330 may provide a function for the clutter removal device 130 to communicate with at least one node through a communication network. According to one embodiment, when the processor 320 of the clutter removal device 130 generates a request signal according to program code stored in a recording device, such as the memory 310, the request signal may be transmitted to at least one node through a communication network under control by the communication unit 330. In contrast to this, a control signal, command, instructions, content, files, and so on provided under control by a processor in at least one node may be received by the clutter removal device 130 through the communication unit 330. According to one embodiment, the communication unit 330 may receive chirp rate information and calculation information. Also, the communication unit 330 may transmit a clutter-removed signal to the outside.

The input/output interface 340 may be a device for an interface between an input device (not illustrated) and an output device (not illustrated). In this case, the input device may include a keyboard or a mouse, and the output device may include a display for displaying an image. In another example, the input/output interface 340 may interface with a device in which functions for an input and an output are integrated into one, such as a touch screen. Specifically, the processor 320 of the clutter removal device 130 may display a service screen or content configured by using data provided by a server on the display 350 through the input/output interface 340 while processing instructions of a computer program loaded into the memory 310. According to one embodiment, the input/output interface 340 may include a device for interfacing with the display 350. The input/output interface 340 may receive a user's input for a web browsing window displayed on the display 350 and receive output data to be output through the display 350 from the processor 320 in response to the user's input.

The display 350 indicates a display module including one or more displays. Each of the one or more displays included in the display 350 may individually display independent content, or the one or more displays may be combined with each other to display single content. According to one embodiment, one or more displays included in the display 350 may include multiple displays that are physically separated from each other or may also be a multi-display physically combined with each other.

Figure 4:
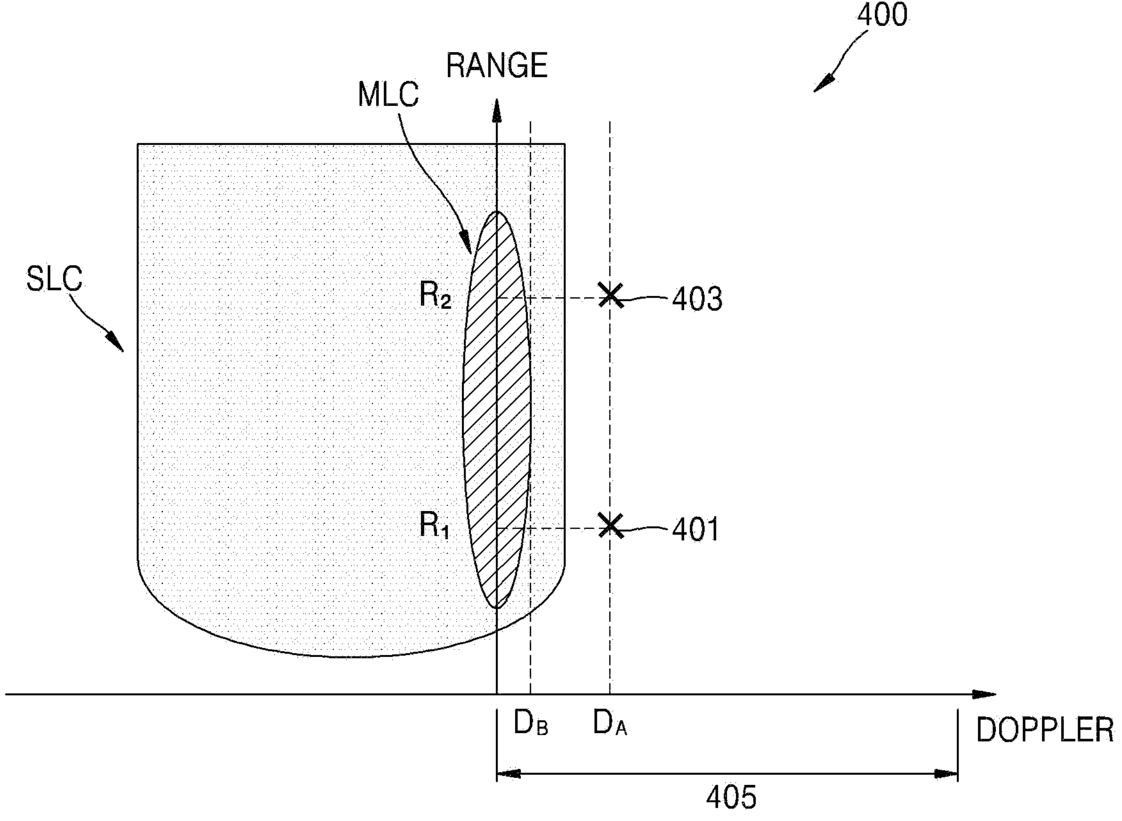
FIG. 4 illustrates an example of a range-Doppler graph determined from a received signal when a pulse Doppler radar in a radar system according to various embodiments does not perform frequency modulation (FM) ranging.

FIG. 4 illustrates an example of a range-Doppler graph 400 determined from a received signal when the pulse Doppler radar 120 in the radar system 100 according to various embodiments does not perform FM ranging. Referring to FIG. 4, a horizontal axis may denote a Doppler frequency and a vertical axis may denote a range.

When the pulse Doppler radar 120 receives signals reflected from a plurality of targets, the clutter removal device 130 may process the received signals to generate a range Doppler graph. FIG. 4 illustrates a case in which the pulse Doppler radar 120 detects a first target 401 and a second target 403 having a Doppler signal of a Doppler A ($D_A$) and respectively located at a range R1 and a range R2. In addition, referring to the range-Doppler graph 400, an MLC region introduced through a main lobe and an SLC region introduced through a side lobe may be determined from a received signal.

The pulse Doppler radar 120 may detect a target by checking a Doppler region-of-interest 405. Referring to FIG. 4, both the first target 401 and the second target 403 are in the Doppler region-of-interest 405, and accordingly, the pulse Doppler radar 120 may detect the first target 401 and the second target 403 through the Doppler region-of-interest 405 and determine a target range.

Referring to FIG. 4, Doppler signals on the first target 401 and the second target 403 are outside the SLC region and the MLC region. However, when an MLC signal is in the Doppler region-of-interest 405, the MLC signal with relatively greater intensity than the target is detected first, and accordingly, the target detection performance of the pulse Doppler radar 120 may be reduced.

To this end, the clutter removal device 130 may remove a clutter signal by using a reference Doppler frequency. Specifically, the clutter removal device 130 calculates a Doppler B ($D_B$) by using the reference Doppler frequency, removes a signal having a Doppler frequency less than the Doppler B ($D_B$) during signal processing, and accordingly, the target detection performance of the pulse Doppler radar 120 may be increased. Here, the Doppler $D_B$ may be determined based on Equation 1.

$$D_B = \frac{4V_r}{\lambda}\sin(\psi_s)\sin(0.5\theta_{nn}) \quad \text{Equation 1}$$

Referring to Equation 1, $D_B$ indicates the Doppler frequency B, $\lambda$ indicates an operating frequency wavelength of the pulse Doppler radar 120, Vr indicates a movement speed of a moving object, $\psi_s$ indicates a beam steering angle, and $\theta_{nn}$ indicates a null-to-null beam width of an antenna of the pulse Doppler radar 120.

Referring to FIG. 4, because the pulse doppler radar 120 does not perform FM ranging, the clutter removal device 130 calculates and determines the Doppler B ($D_B$), removes a signal having a Doppler frequency less than the Doppler B ($D_B$), and thus, the detection performance of the pulse Doppler radar 120 may be increased. However, when the pulse Doppler radar 120 performs the FM ranging, the MLC region and the SLC region in the range-Doppler graph 400 may be different from each other. A method of determining a Doppler frequency by using the clutter removal device 130 when FM ranging is performed is described in detail with reference to FIG. 5.

Figure 5:
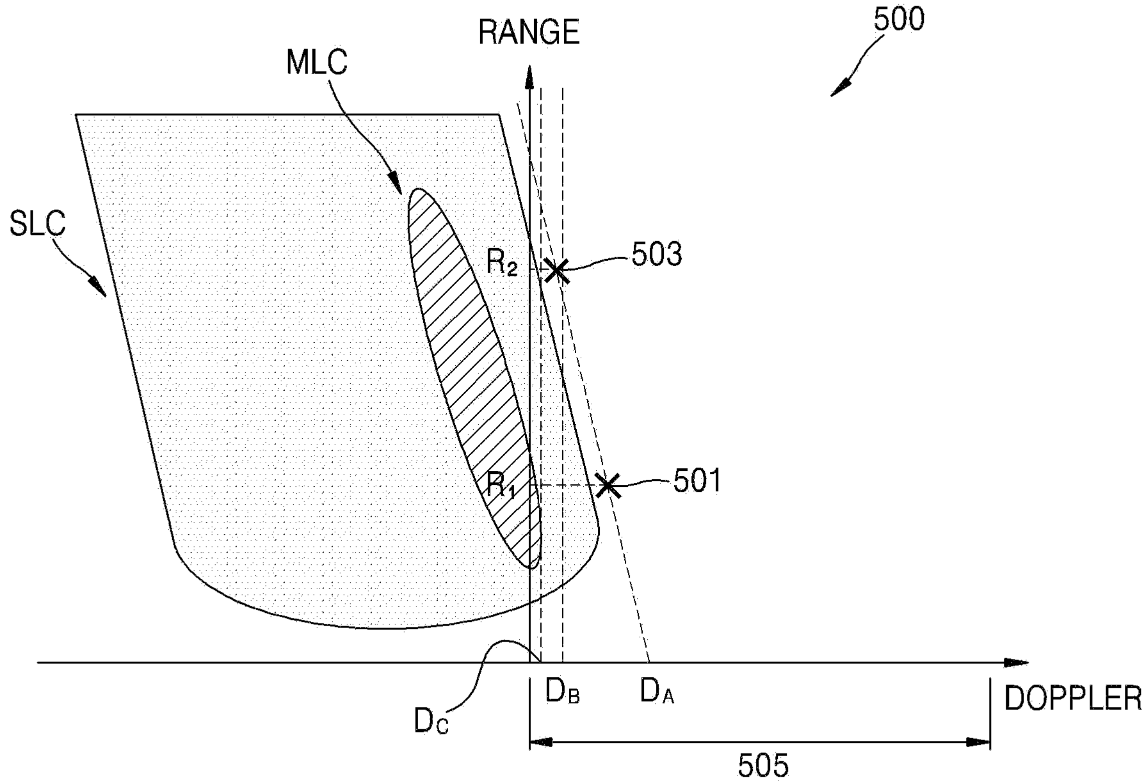
FIG. 5 illustrates an example of a range-Doppler graph determined from a received signal when a pulse Doppler radar in a radar system according to various embodiments performs FM ranging.

FIG. 5 illustrates an example of a range-Doppler graph 500 determined from a received signal when the pulse Doppler radar 120 in the radar system 100 according to various embodiments performs FM ranging. Referring to FIG. 5, a horizontal axis may indicate a Doppler frequency and a vertical axis may indicate a range.

As the pulse doppler radar 120 transmits a transmission signal linearly modulated according to a constant chirp rate to a target, a clutter region and a Doppler of a target signal may change linearly according to a range in the range-Doppler graph 500 determined from a received signal. FIG. 5 illustrates a case in which the pulse Doppler radar 120 detects a first target 501 and a second target 503 having a Doppler signal of a Doppler A ($D_A$) and respectively located at a range R1 and a range R2. Also, unlike FIG. 4, an MLC region introduced through a main lobe and an SLC region introduced through a side lobe may be inclined as illustrated in FIG. 5.

Referring to FIG. 5, in a Doppler region-of-interest 505, when the first target 501 is located at the range R1, the first target 501 has a Doppler frequency greater than a Doppler B ($D_B$) even after a Doppler is changed by FM ranging, and accordingly, the pulse Doppler radar 120 may detect the first target 501. However, the second target 503 located at the range R2 has a Doppler frequency less than the Doppler B ($D_B$) due to FM ranging, the pulse Doppler radar 120 may not perform signal processing on the second target 503 and may not detect the second target 503. That is, as the FM ranging is performed, the pulse doppler radar 120 may not detect a low-speed target at a long range.

In order to detect the second target 503 located at the range R2, the clutter removal device 130 may obtain the most accurate reference Doppler frequency according to a real-time MLC region by using a chirp rate and a beam steering angle. Specifically, when FM ranging is performed, the clutter removal device 130 may calculate a reference Doppler frequency by considering a chirp rate and a beam steering angle to be applied. The clutter removal device 130 may extend a signal processing region by modeling a clutter profile according to a chirp rate in the form of a cubic equation and calculating the greatest MLC Doppler according to a beam steering angle. That is, the clutter removal device 130 may detect the second target 503 located at the range R2 by determining a Doppler C ($D_C$) rather than the Doppler B ($D_B$) as a reference Doppler frequency for removing the MLC region.

The clutter removal device 130 may obtain chirp rate information and calculation information to calculate the Doppler C ($D_C$). According to one embodiment, the chirp rate information may indicate information on a chirp rate applied to a transmission pulse of the pulse Doppler radar 120, and the calculation information may include a movement speed of the moving object 110, an altitude of the moving object 110, a wavelength of an operating frequency of the pulse Doppler radar 120, a first beam steering angle of the pulse Doppler radar 120, and a beam width of an antenna of the pulse Doppler radar 120.

Thereafter, the clutter removal device 130 may determine a second beam steering angle that is different from the first beam steering angle by using the calculation information and the chirp rate information and may calculate a plurality of Doppler frequencies related to the first beam steering angle and the second beam steering angle. Then, the clutter removal device 130 may calculate a reference Doppler frequency from the plurality of Doppler frequencies.

Specifically, the clutter removal device 130 may calculate first to fourth Doppler frequencies D1, D2, D3, and D4 and determine the Doppler C ($D_C$) from the first to fourth Doppler frequencies D1, D2, D3, and D4. Each of the plurality of Doppler frequencies may be determined based on Equation 2.

$$f(\psi, V, H, k, \lambda)) = \frac{2V}{\lambda} - \frac{2kH}{c_0 \sin(\psi)} \quad \text{Equation 2}$$

Referring to Equation 2, f indicates a function that determines a Doppler frequency value, qi indicates a beam steering angle of the pulse Doppler radar 120, V indicates a movement speed of the pulse Doppler radar 120, H indicates an altitude of the pulse Doppler radar 120, k indicates a chirp rate, λ indicates a wavelength of an operating frequency, and $c_0$ indicates the speed of light.

That is, the clutter removal device 130 may determine a Doppler frequency by using factors including a beam width θnn, in addition to ψ, V, H, k, and A, and may calculate a plurality of Doppler frequencies by changing at least one of the factors. Factors that determine the first to fourth Doppler frequencies D1, D2, D3, and D4 may be determined as illustrated in Table 1.

TABLE 1

| | |
|---|---|
| First Doppler value (D1) | $f(\psi_{so}, V_r, H_r, k, \lambda)$ |
| Second Doppler value (D2) | $f(\psi_o + 0.5\theta\ nn, V_r, H_r, k, \lambda)$ |
| Third Doppler value (D3) | $f(\psi_o - 0.5\theta\ nn, V_r, H_r, k, \lambda)$ |
| Fourth Doppler value (D4) | $f(\psi_o, V_r, H_r, k, \lambda)$ |

After calculating the first to fourth Doppler frequencies D1, D2, D3, and D4 by using the factors illustrated in Table 1, the clutter removal device 130 may determine a reference Doppler frequency from the first to fourth Doppler frequencies D1, D2, D3, and D4. The reference Doppler frequency may be determined based on Equation 3.

$$D_c = \max(D_1, D_2, D_3) - D_4 \quad \text{Equation 3}$$

Referring to Equation 3, $D_C$ indicates the Doppler C, D1 to D4 indicate first to fourth Doppler frequencies, and max(a,b,c) indicates a function that outputs the greatest value among a, b, and c.

As described above, the clutter removal device 130 may determine a reference Doppler frequency by considering a chirp rate and a beam steering angle and may remove a signal having a frequency less than or equal to the determined reference Doppler frequency.

Referring to Table 1, the clutter removal device 130 may determine the first Doppler frequency D1 for a second beam steering angle by calculating the second beam steering angle from the calculation information, determine the second Doppler frequency D2 for an angle obtained by adding an angle corresponding to a beam width to a first beam steering angle, and determine the third Doppler frequency D3 for an angle obtained by removing the angle corresponding to the beam width from the first beam steering angle, and determine the fourth Doppler value D4 for the first beam steering angle.

That is, the clutter removal device 130 may determine the second to fourth Doppler frequencies $D_2$, $D_3$, and $D_4$ based on the calculation information and the chirp rate. However, a second steering angle $\psi_{so}$ is required to determine the first Doppler frequency $D_1$, and accordingly, the clutter removal device 130 may determine the second steering angle $\psi_{so}$ to calculate the first Doppler frequency $D_1$. The clutter removal device 130 may first determine a first calculation value based on Equation 4.

$$\alpha = \left(\frac{k\lambda H}{c_0 V}\right)^2 \quad \text{Equation 4}$$

Referring to Equation 4, α indicates the first calculation value, k indicates a chirp rate, λ indicates a wavelength of an operating frequency, H indicates an altitude, $c_0$ indicates the speed of light, and V indicates a movement speed.

Thereafter, the clutter removal device 130 may determine a second calculation value from the first calculation value by using a function for deriving a real value. The second calculation value may be determined based on Equation 5.

$$\rho_0 = nthroot\left(\frac{-\alpha + \sqrt{\alpha^2 - \frac{4\alpha^3}{27}}}{2}, 3\right) + nthroot\left(\frac{-\alpha - \sqrt{\alpha^2 - \frac{4\alpha^3}{27}}}{2}, 3\right) \quad \text{Equation 5}$$

Referring to Equation 5, $\rho_0$ indicates the second calculation value, an nthroot(a,b) function indicates a function that outputs a real value among b-order square roots of a, and α indicates the first calculation value.

Then, the clutter removal device 130 may determine the second beam steering angle $\psi_{so}$ from the second calculation value. The second beam steering angle $\psi_{so}$ may be determined based on Equation 6.

$$\alpha = \left(\frac{k\lambda H}{c_0 V}\right)^2 \quad \text{Equation 4}$$

Referring to Equation 6, $\psi_{so}$ indicates the second beam steering angle and ρ0 indicates the second calculation value.

That is, the clutter removal device 130 may determine the first Doppler frequency $D_1$ by using the second beam steering angle $\psi_{so}$ determined by Equation 6, Vr, Hr, and λ included in the calculation information, and the chirp rate k.

The clutter removal device 130 may determine a reference Doppler frequency based on the first Doppler frequency $D_1$ and the second to fourth Doppler frequencies $D_2$, $D_3$, and $D_4$ determined from the calculation information and the chirp rate. Thereafter, the clutter removal device 130 may remove a signal having a frequency less than or equal to the reference Doppler frequency, and thus, the detection performance of the pulse Doppler radar 120 for the second target 503 may be improved.

Figure 6:
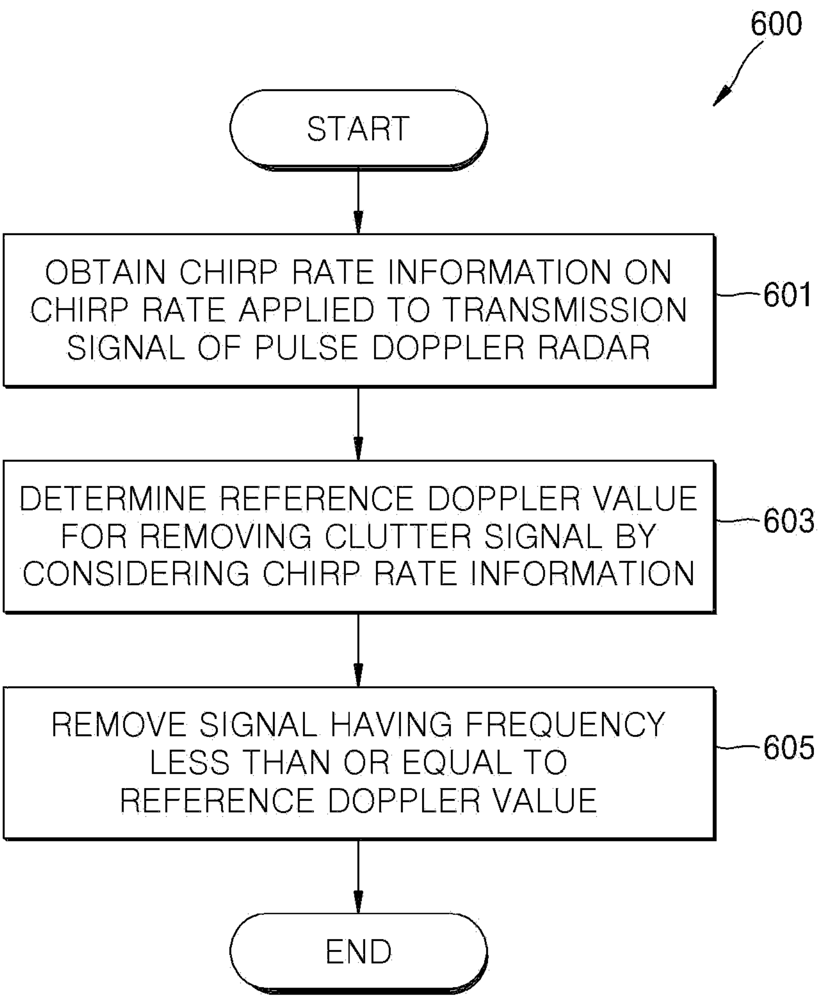
FIG. 6 is a flowchart illustrating an operating method of a clutter removal device in a radar system, according to various embodiments.

FIG. 6 is a flowchart 600 of an operating method of the clutter removal device 130 in the radar system 100, according to various embodiments. FIG. 6 illustrates an operating method of the clutter removal device 130 using the processor 320 in the radar system 100 including the pulse Doppler radar 120.

Referring to FIG. 6, in operation 601, the clutter removal device 130 obtains chirp rate information on a chirp rate applied to a transmission signal of the pulse Doppler radar 120. According to one embodiment, the pulse Doppler radar 120 may modulate a frequency of the transmission signal according to the chirp rate and transmit the chirp rate information to the clutter removal device 130. Additionally, the clutter removal device 130 may obtain calculation information. According to one embodiment, the calculation information may include a movement speed of the pulse Doppler radar 120, an altitude of the pulse Doppler radar 120, a wavelength of an operating frequency of the pulse Doppler radar 120, a first beam steering angle of the pulse Doppler radar 120, and a beam width of an antenna of the pulse Doppler radar 120.

In operation 603, the clutter removal device 130 determines a reference Doppler frequency for removing a clutter signal by considering the chirp rate information. The reference Doppler frequency indicates a reference value for removing a clutter signal. The clutter removal device 130 may calculate the reference Doppler frequency by using a chirp rate applied to a transmission pulse and the calculation information. According to one embodiment, the clutter removal device 130 may determine the reference Doppler frequency by using Equation 2 to Equation 6 described above. A detailed method of determining the reference Doppler frequency by using the clutter removal device 130 is described in detail in operations of FIG. 7.

In operation 605, the clutter removal device 130 removes a signal having a frequency less than or equal to the reference Doppler frequency. According to one embodiment, the clutter removal device 130 may reduce the signal having a frequency less than or equal to the reference Doppler frequency, and thus, an clutter in a Doppler region-of-interest may be reduced.

Figure 7:
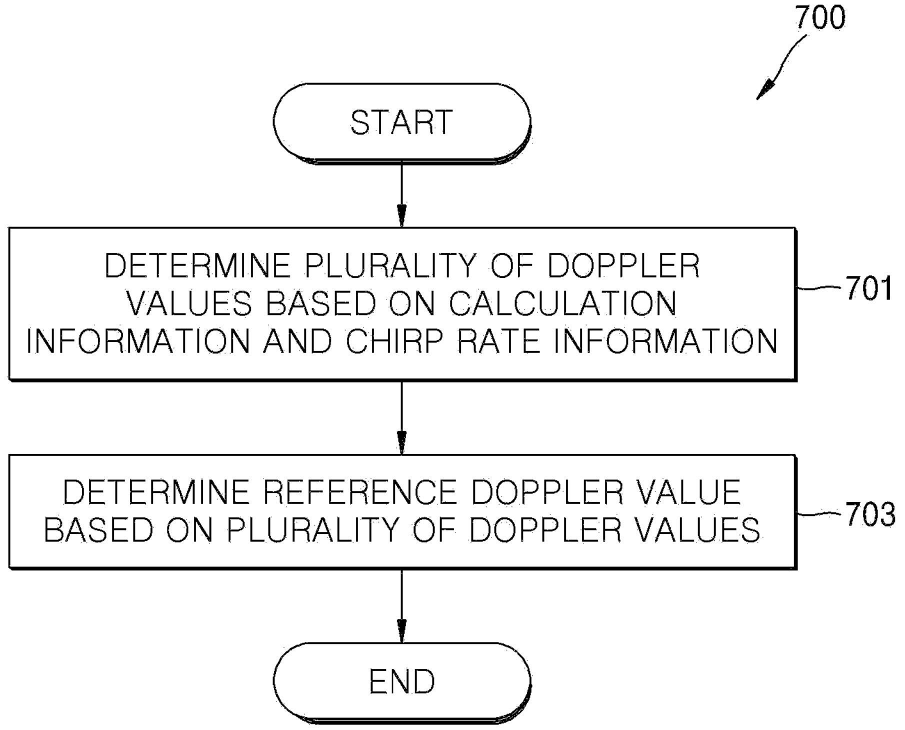
FIG. 7 is a flowchart illustrating a method of determining a reference Doppler frequency by a clutter removal device in a radar system, according to various embodiments.

FIG. 7 is a flowchart 700 of a method of determining a reference Doppler frequency by the using clutter removal device 130 in the radar system 100 according to various embodiments.

In operation 701, the clutter removal device 130 determines a plurality of Doppler frequencies based on the calculation information and the chirp rate information. According to one embodiment, the clutter removal device 130 may determine a second beam steering angle based on calculation information, determine a first Doppler frequency for the second beam steering angle, determine a second Doppler frequency for an angle obtained by adding an angle corresponding to a beam width to a first beam steering angle, determine a third Doppler frequency for an angle obtained by removing the angle corresponding to the beam width from the first beam steering angle, and determine a fourth Doppler frequency for the first beam steering angle.

According to one embodiment, the clutter removal device 130 may determine a first calculation value based on a movement speed, an altitude, chirp rate information, and a wavelength of an operating frequency to determine the second beam steering angle, determine a second calculation value from the first calculation value based on a function that derives a real value, and determine the second beam steering angle based on the second calculation value based on the function that derives the real value.

According to one embodiment, the first calculation value may be determined based on Equation 4, the second calculation value may be determined based on Equation and the second beam steering angle may be determined based on Equation 6.

According to one embodiment, each of a plurality of Doppler frequencies may be determined based on Equation 2.

In operation 703, the clutter removal device 130 determines a reference Doppler frequency based on the plurality of Doppler frequencies. According to one embodiment, the clutter removal device 130 may determine a difference between the fourth Doppler frequency and the greatest Doppler frequency among the first Doppler frequency, the second Doppler frequency, and the third Doppler frequency, as the reference Doppler frequency. Specifically, the reference Doppler frequency may be determined based on Equation 3 from each of a plurality of Doppler frequencies.

Methods according to the embodiments described in the claims or specification of the present disclosure may be implemented in the form of hardware, software, or a combination of hardware and software.

When the methods are implemented in software, a computer readable storage medium storing one or more programs (software modules) may be provided. One or more programs stored in a computer-readable storage medium are configured to be executable by one or more processors in an electronic device. The one or more programs include instructions that cause an electronic device to perform methods according to embodiments described in the claims or specification of the present disclosure.

The programs (software modules or software) may be stored in non-volatile memory, such as RAM or flash memory, ROM, electrically erasable programmable ROM (EEPROM), a magnetic disk storage device, a CD-ROM, a digital versatile disk (DVD), an optical storage device, or a magnetic cassette. Alternatively, the programs may be stored in a memory composed of a combination of some or all of the memory devices. In addition, a plurality of configuration memories may be included therein.

In addition, the programs may be stored in an attachable storage device that may be accessed through a communication network, such as the Internet, an intranet, a local area network (LAN), a wide area network (WAN), or a storage area network (SAN), or a communication network consisting of a combination thereof. The storage device may be connected to a device performing embodiments through an external port. In addition, a separate storage device on a communication network may also be connected to a device that performs the embodiments.

In the detailed embodiments described above, components included in the present disclosure are described in singular or plural numbers according to the detailed embodiments. However, singular expressions or plural expressions are selected appropriately for the presented situation for the sake of convenience of description, and the present disclosure is not limited to a single component or plural components, and the plural components may be composed of a single component, or the single component may be composed of plural components.

A device and a method according to various embodiments enable a radar system, which uses a pulse Doppler radar, to remove clutter included in a signal received by a radar.

Also, the device and method according to various embodiments may accurately determine a Doppler frequency for removing a clutter signal by considering a chirp rate and a beam steering angle applied to FM ranging.

Also, the device and method according to various embodiments enable a target detection region to be accurately determined by accurately determining a Doppler frequency.

In addition, the device and method according to various embodiments increase a target range that may be detected by a pulse Doppler radar by accurately determining a Doppler frequency, and thus, target detection performance may be improved.

Effects obtainable by the present disclosure are not limited to the effects described above, and other effects not described may be clearly understood by those skilled in the art to which the present disclosure belongs from the descriptions below.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

The invention claimed is:

1. A method of removing clutter in a radar system including a pulse Doppler radar, the method comprising:
   - obtaining chirp rate information on a chirp rate applied to a transmission signal of the pulse Doppler radar;
   - obtaining calculation information including a movement speed of the pulse Doppler radar, an altitude of the pulse Doppler radar, a wavelength of an operating frequency of the pulse Doppler radar, a first beam steering angle of the pulse Doppler radar, and a beam width of an antenna of the pulse Doppler radar;
   - determining a reference Doppler frequency for removing a clutter signal by:
     - determining a first calculation value based on the movement speed, the altitude, the chirp rate information, and the wavelength of the operating frequency;
     - determining a second calculation value from the first calculation value based on a function that derives a real value;
     - determining a second beam steering angle based on the second calculation value;
     - determining a first Doppler frequency for the second beam steering angle;
     - determining a second Doppler frequency for an angle obtained by adding an angle corresponding to the beam width to the first beam steering angle;
     - determining a third Doppler frequency for an angle obtained by removing the angle corresponding to the beam width from the first beam steering angle;
     - determining a fourth Doppler frequency for the first beam steering angle; and
     - determining the reference Doppler frequency based on the first, second, third, and fourth Doppler frequencies; and
   - removing a signal having a frequency less than or equal to the reference Doppler frequency.

2. The method of claim 1, wherein the first operation value is determined based on Equation 1 below, $$\alpha = \left(\frac{k\lambda H}{c_0 V}\right)^2 \quad \text{Equation 1}$$

where $\alpha$ indicates the first calculation value, k indicates the chirp rate, $\lambda$ indicates the wavelength of the operating frequency, H indicates the altitude, $c_0$ indicates the speed of light, and V indicates the movement speed, the second calculation value is determined based on Equation 2 below, $$\rho_0 = nthroot\left(\frac{-\alpha + \sqrt{\alpha^2 - \frac{4\alpha^3}{27}}}{2}, 3\right) + nthroot\left(\frac{-\alpha - \sqrt{\alpha^2 - \frac{4\alpha^3}{27}}}{2}, 3\right) \quad \text{Equation 2}$$

where $\rho_0$ indicates the second calculation value, and the second beam steering angle is determined based on Equation 3 below, $$\psi_{so} = \sin^{-1}\sqrt{-\rho_0} \quad \text{Equation 3}$$

where $\psi_{so}$ indicates the second beam steering angle.

3. The method of claim 1, wherein each of the plurality of Doppler frequencies is determined based on Equation 4 below, $$f(\psi, V, H, k, \lambda)) = \frac{2V}{\lambda} - \frac{2kH}{c_0 \sin(\psi)} \quad \text{Equation 4}$$

where f indicates a Doppler frequency, V indicates the movement speed, $\lambda$ indicates the wavelength of the operating frequency, $c_0$ indicates the speed of light, k indicates the chirp rate, H indicates the altitude, and $\psi$ indicates a beam steering angle.

4. The method of claim 1, wherein the determining of the reference Doppler frequency comprises determining a difference between the fourth Doppler frequency and a greatest Doppler frequency among the first Doppler frequency, the second Doppler frequency, and the third Doppler frequency, as the reference Doppler frequency.

5. A clutter removal device in a radar system including a pulse Doppler radar, the clutter removal device comprising:

a processor, wherein the processor is configured to;
   - obtain chirp rate information on a chirp rate applied to a transmission signal of the pulse Doppler radar;
   - obtain calculation information including a movement speed of the pulse Doppler radar, an altitude of the pulse Doppler radar, a wavelength of an operating frequency of the pulse Doppler radar, a first beam steering angle of the pulse Doppler radar, and a beam width of an antenna of the pulse Doppler radar;
   - determine a reference Doppler frequency for removing a clutter signal by:

determine a first calculation value based on the movement speed, the altitude, the chirp rate information, and the wavelength of the operating frequency, determine a second calculation value from the first calculation value based on a function that derives a real value, determine a second beam steering angle based on the second calculation value, determine a first Doppler frequency for the second beam steering angle, determine a second Doppler frequency for an angle obtained by adding an angle corresponding to the beam width to the first beam steering angle, determine a third Doppler frequency for an angle obtained by removing the angle corresponding to the beam width from the first beam steering angle, determine a fourth Doppler frequency for the first beam steering angle, and determine the reference Doppler frequency based on the first, second, third, and fourth Doppler frequencies; and remove a signal having a frequency less than or equal to the reference Doppler frequency.

6. The clutter removal device of claim 5, wherein the processor is configured to determine a difference between the fourth Doppler frequency and a greatest Doppler frequency among the first Doppler frequency, the second Doppler frequency, and the third Doppler frequency, as the reference Doppler frequency.

7. A method of removing clutter in a radar system including a pulse Doppler radar, the method comprising:

obtaining chirp rate information on a chirp rate applied to a transmission signal of the pulse Doppler radar;

obtaining calculation information including a movement speed of the pulse Doppler radar, an altitude of the pulse Doppler radar, a wavelength of an operating frequency of the pulse Doppler radar, a first beam steering angle of the pulse Doppler radar, and a beam width of an antenna of the pulse Doppler radar;

determining a reference Doppler frequency for removing a clutter signal by:

determining a plurality of Doppler frequencies based on the calculation information and the chirp rate information; and determining the reference Doppler frequency based on the plurality of Doppler frequencies; and removing a signal having a frequency less than or equal to the reference Doppler frequency, wherein each of the plurality of Doppler frequencies is determined based on Equation 4 below, $$f(\psi, V, B, k, \lambda)) = \frac{2V}{\lambda} - \frac{2kH}{c_0 \sin(\psi)} \quad \text{Equation 4}$$

where f indicates a Doppler frequency, V indicates the movement speed, $\lambda$ indicates the wavelength of the operating frequency, $c_0$ indicates the speed of light, k indicates the chirp rate, H indicates the altitude, and v indicates a beam steering angle.

* * * * *